United States Patent
Bekas et al.

(10) Patent No.: US 10,303,439 B2
(45) Date of Patent: May 28, 2019

(54) LOGARITHM AND POWER (EXPONENTIATION) COMPUTATIONS USING MODERN COMPUTER ARCHITECTURES

(71) Applicant: International Business Machines Corporation, Armonk, NY (US)

(72) Inventors: Konstantinos Bekas, Horgen (CH); Alessandro Curioni, Gattikon (CH); Yves G. Ineichen, Zurich (CH); Cristiano Malossi, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 15/138,846

(22) Filed: Apr. 26, 2016

(65) Prior Publication Data
US 2017/0308357 A1    Oct. 26, 2017

(51) Int. Cl.
*G06F 7/556*   (2006.01)
*G06F 1/03*    (2006.01)
*G06F 7/499*   (2006.01)

(52) U.S. Cl.
CPC ............ *G06F 7/556* (2013.01); *G06F 1/0307* (2013.01); *G06F 7/49915* (2013.01)

(58) Field of Classification Search
CPC ...... G06F 1/0307; G06F 1/0356; G06F 7/552; G06F 7/7556; G06F 7/556
See application file for complete search history.

(56) References Cited

U.S. PATENT DOCUMENTS

| 5,604,691 | A | * | 2/1997 | Dworkin | ............... G06F 1/0307 |
| | | | | | 341/75 |
| 5,831,878 | A | * | 11/1998 | Ishida | ..................... H03M 7/50 |
| | | | | | 708/204 |
| 6,976,043 | B2 | * | 12/2005 | Clifton | .................. G06F 1/0356 |
| | | | | | 708/272 |
| 7,676,535 | B2 | | 3/2010 | Donofrio et al. | |

(Continued)

OTHER PUBLICATIONS

Amir Morad et al.,"Efficient Dense and Sparse Matrix Multiplication on GP-SIMD", 24th International Workshop on Power and Timing Modeling, Optimization and Simulation (PATMOS),Israel Institute of Technology, Sep. 29-Oct. 1, 2014, pp. 1-8.

*Primary Examiner* — Chuong D Ngo
(74) *Attorney, Agent, or Firm* — Cantor Colburn LLP; Daniel Morris

(57) ABSTRACT

Embodiments of the present invention may provide the capability to evaluate logarithm and power (exponentiation) functions using either hardware specific instructions, or a hardware specific implementation with reduced memory requirements. An input comprising a floating point representation of a real number may be received and a mantissa and an exponent may be extracted. A function of a logarithm of a mantissa of the real number may be approximated by utilizing a polynomial based on the mantissa. The approximated function of the logarithm may be combined with the exponent for calculating a value comprising a logarithm of the real number. Likewise, an input comprising a floating point representation of a real number and a representation of a second number may be received and an approximation of the real number to the power of the second number may be generated.

9 Claims, 6 Drawing Sheets

(56) References Cited

U.S. PATENT DOCUMENTS

| | | |
|---|---|---|
| 8,914,801 B2 | 12/2014 | Anand et al. |
| 2007/0061389 A1* | 3/2007 | Hussain ................ G06F 1/0307 708/277 |
| 2010/0030833 A1* | 2/2010 | Mogi ...................... G06F 7/483 708/512 |
| 2014/0222883 A1* | 8/2014 | Pineiro .................... G06F 1/02 708/523 |
| 2015/0103252 A1 | 4/2015 | Rane et al. |

\* cited by examiner

LOGARITHM AND POWER (EXPONENTIATION) COMPUTATIONS USING MODERN COMPUTER ARCHITECTURES

BACKGROUND

The present invention relates to techniques for computing logarithm and power (exponentiation) functions using hardware specific instructions.

Fast and energy efficient computation is important in many computing applications. The particular computations to be performed vary depending upon the application. For example, so-called "big data" applications and data in motion applications may compute logarithmic and power functions. Examples of such applications may include deep learning, neural network simulations, as well as the modeling of dynamic systems such as population growth, electrical circuits, cardiovascular networks, optimization problems, cryptography, and many others.

There are a number of well-known techniques for computing results using logarithm and power (exponentiation) functions. Such techniques may include Taylor series/expansions computations, look-up tables, manipulation in accordance with the IEEE-745 standards, combinations of these techniques, and others. Each of these techniques has advantages and disadvantages—some are quite complex and resource intensive, some are relatively inaccurate, etc. For example, computing logarithm and power (exponentiation) functions using general standardized or general purpose processors is usually relatively slow, and uses a relatively large amount of memory.

A need arises for a technique that provides the capability to evaluate logarithm and power (exponentiation) functions that provides improved speed and/or accuracy, and reduced memory usage.

SUMMARY

Embodiments of the present invention may provide the capability to evaluate logarithm and power (exponentiation) functions using hardware specific instructions. Likewise, embodiments of the present invention may provide the capability to evaluate logarithm and power (exponentiation) functions improved speed and/or accuracy, and reduced memory usage. The memory usage may be reduced sufficiently that embodiments may be implemented in specialized processing hardware.

According to an embodiment of the present invention, a system for performing mathematical function evaluation may comprise a processing unit comprising logic comprising a first set of hardware instructions configured to receive an input comprising a floating point representation of a real number and to extract a mantissa and an exponent, a second set of hardware instructions configured to approximate a function of a logarithm of a mantissa of the real number, wherein approximation may be performed by utilizing a polynomial, and wherein the polynomial is based on the mantissa, and a third set of hardware instructions configured to combine the approximate function of the logarithm of the mantissa of the real number and the exponent for calculating a value comprising an approximate logarithm of the real number.

The polynomial may be a Lagrange polynomial, an orthogonal polynomial, a Chebyshev polynomial, a Legendre polynomial, a trigonometric polynomial, a piecewise polynomial, a spline polynomial, a Hermite polynomial, or a Remez Polynomial. The input may further comprise a degree of the polynomial. Coefficients of the polynomial may be precomputed. The input may be a single scalar input value, a list of multiple scalar input values, or an input vector including multiple values. The system may further comprise a plurality of processing units, wherein each processing unit performs a same hardware instruction at a same time as the others of the plurality of processing units.

According to an embodiment of the present invention, a computer-implemented method for using hardware instructions to accelerate evaluation of mathematical functions, may comprise executing a first set of hardware instructions to receive an input comprising a floating point representation of a real number and to extract a mantissa and an exponent, executing a second set of hardware instructions to approximate a function of a logarithm of a mantissa of the real number, wherein approximation may be performed by utilizing a polynomial, and wherein the polynomial is based on the mantissa, and executing a third set of hardware instructions to combine the approximate function of the logarithm of the mantissa of the real number and the exponent for calculating a value comprising an approximate logarithm of the real number.

According to an embodiment of the present invention, a system for performing mathematical function evaluation may comprise a processing unit comprising logic comprising a first set of hardware instructions configured to receive an input comprising a floating point representation of a real number and a representation of a second number and to extract a mantissa and an exponent from the floating point representation of the real number, a second set of hardware instructions configured to approximate a function of a logarithm of a mantissa of the real number, wherein approximation is performed by utilizing a polynomial, and wherein the polynomial is based on the mantissa, a third set of hardware instructions configured to combine the approximate function of the logarithm of the mantissa of the real number and the exponent for calculating a value comprising an approximate logarithm of the real number, a fourth set of hardware instructions configured to multiply the approximate logarithm of the of the real number and the second number, and a fifth set of hardware instructions configured to exponentiate the product of the approximate logarithm of the of the real number and the second number for calculating a value comprising an approximation of the real number to the power of the second number.

According to an embodiment of the present invention, a computer-implemented method for using hardware instructions to accelerate evaluation of mathematical functions may comprise executing a first set of hardware instructions configured to receive an input comprising a floating point representation of a real number and a representation of a second number and to extract a mantissa and an exponent from the floating point representation of the real number, executing a second set of hardware instructions configured to approximate a function of a logarithm of a mantissa of the real number, wherein approximation is performed by utilizing a polynomial, and wherein the polynomial is based on the mantissa, executing a third set of hardware instructions configured to combine the approximate function of the logarithm of the mantissa of the real number and the exponent for calculating a value comprising an approximate logarithm of the real number, executing a fourth set of hardware instructions configured to multiply the approximate logarithm of the of the real number and the second number, and executing a fifth set of hardware instructions configured to exponentiate the product of the approximate function of the logarithm of the mantissa of the real number and the second number for calculating a value comprising an approximation of the real number to the power of the second number.

According to an embodiment of the present invention, an apparatus may comprise a first at least one specialized processing elements specifically adapted to receive an input comprising a representation of a real number X, a second at least one specialized processing elements specifically adapted to extract a mantissa M and an exponent Z, based on the real number X, wherein the extraction of M and Z is obtained from a floating point representation, a third at least one specialized processing elements specifically adapted to approximate a function of a logarithm of the mantissa M of the real number X, wherein the approximation is performed utilizing a polynomial, and wherein the polynomial is based on the mantissa M, and a fourth at least one specialized processing elements specifically adapted to combine the approximate function of the logarithm of the mantissa M and the exponent Z for calculating a value comprising an approximate logarithm of the real number X, wherein the processing performed by the first, second, third, and/or fourth specialized processing elements for calculating the value comprising the logarithm is executed while utilizing an amount of memory that is significantly less than an amount of memory that would be used by a general standardized at least one processors for calculating the value.

According to an embodiment of the present invention, an apparatus may comprise a first at least one specialized processing element specifically adapted to receive an input comprising a representation of a first real number X and a second number, a second at least one specialized processing element specifically adapted to extract a mantissa M and an exponent Z, based on the real number X, wherein the extraction of M and Z is obtained from a floating point representation, a third at least one specialized processing element specifically adapted to approximate a function of a logarithm of the mantissa M of the real number X, wherein the approximation is performed utilizing a polynomial, and wherein the polynomial is based on the mantissa M, a fourth at least one specialized processing element specifically adapted to combine the approximate function of the logarithm of the mantissa M of the real number X and the exponent Z for calculating a value comprising an approximate logarithm of the real number X, a fifth at least one specialized processing element specifically adapted to multiply the approximate logarithm of the real number X and the second number, and a sixth at least one specialized processing element specifically adapted to exponentiate the product of the of the real number X and the second number for calculating a value comprising an approximation of the real number X to the power of the second number, wherein the processing performed by the first, second, third, fourth, and/or fifth specialized processing elements for calculating the value comprising the logarithm is executed while utilizing an amount of memory that is significantly less than an amount of memory that would be used by a general standardized at least one processors for calculating the value.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present invention may provide the capability to evaluate logarithm and power (exponentiation) functions using hardware specific instructions.

Figure 1:
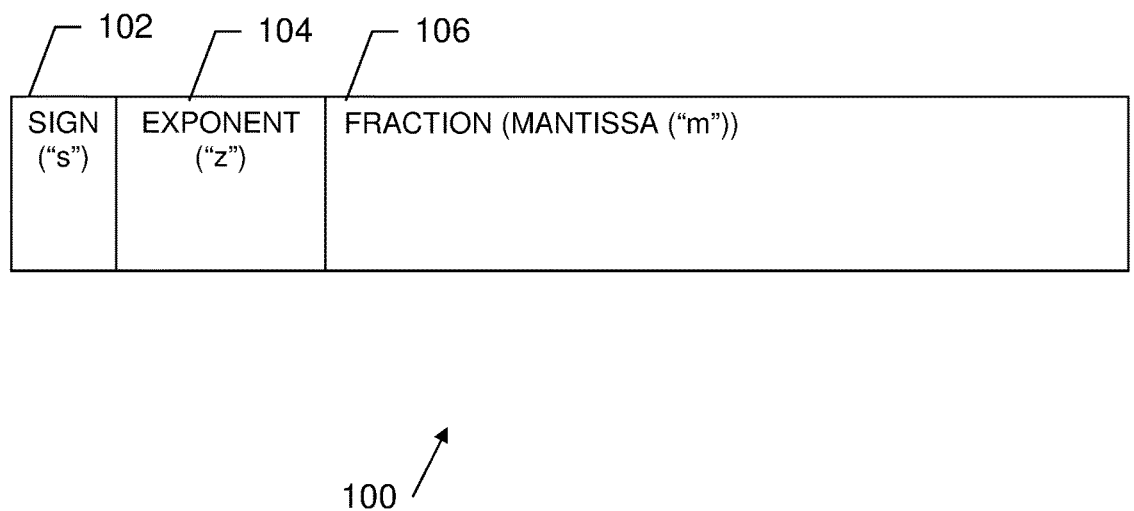
FIG. 1 is an exemplary diagram of a storage format of a floating-point number.

An example of a storage format 100 of a floating-point number is shown in FIG. 1. In this example, the format 100 includes a sign portion 102, an exponent portion 104, and a fraction or mantissa portion 106. For simplicity, sign portion 102 may be termed "s", exponent portion 104 may be termed "z", and mantissa portion 106 may be termed "m". As an example, in the IEEE 754 Standard double-precision binary floating-point format known as binary64, s is 1 bit, z is 11 bits and m is 52 bits. In the binary64 example, z is encoded using an offset-binary representation, with the zero offset (also known as exponent bias) being 1023.

The following notations are used herein: "*" is a multiplication, "^" is a power (exponentiation) evaluation, "&" is the bitwise AND operator, "|" is the bitwise OR operator, "≈" indicates an approximation, "Int" indicates a generic integer (no assumption on the specific machine representation, e.g., int, long int, unsigned long int.), "Real" indicates a generic real or floating-point number (no assumption on the specific machine representation is given, e.g., float, double, long double), "$\log_2(\ )$" is the base 2 logarithm, "log 10( )" is the base 10 logarithm, and "ln( )" is the natural logarithm (the base is the Euler number e≈2.71828).

Figure 2:
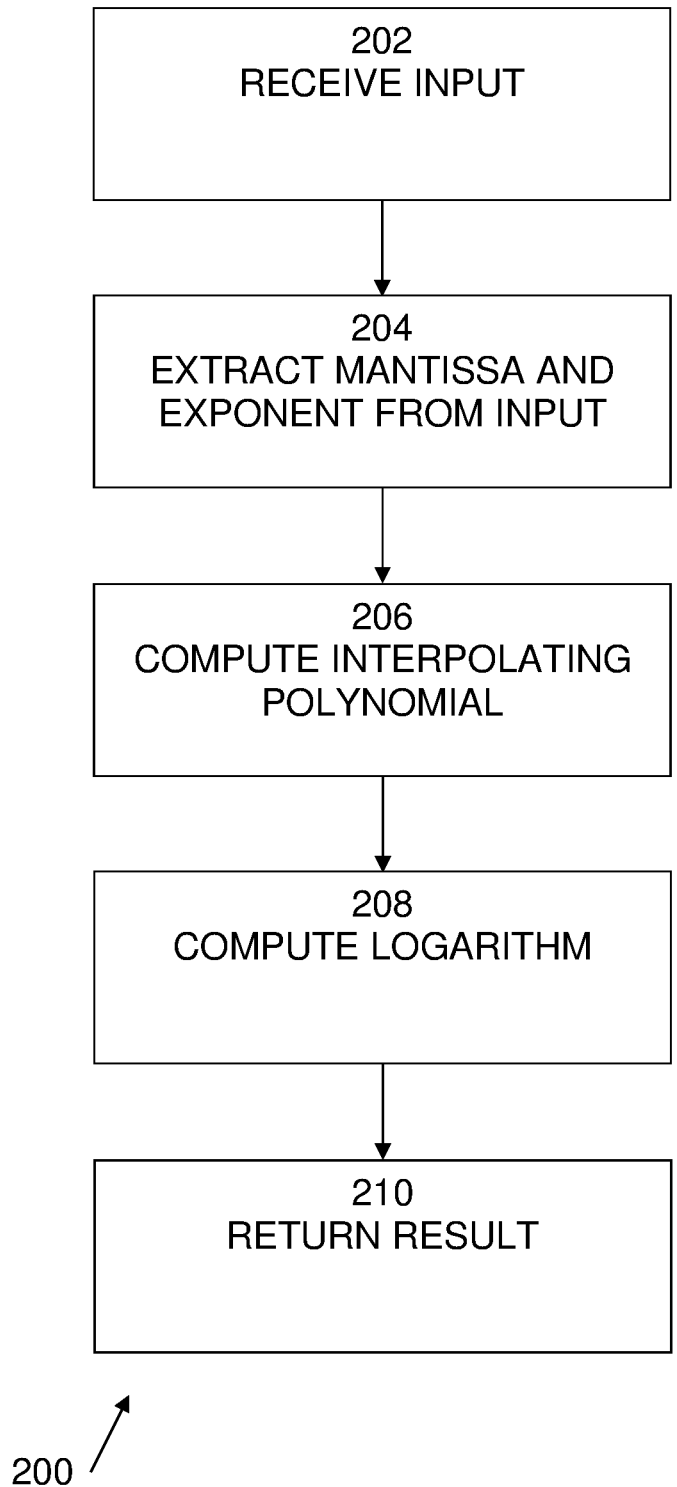
FIG. 2 is an exemplary flow diagram of a process of computing a logarithm of an input.

An exemplary flow diagram of a process 200 of computing a logarithm of an input is shown in FIG. 2. Process 200 begins with 202, in which an input, for which a logarithm is to be computed, is received. The input may be a single scalar input value, a list of multiple scalar input values, or an input vector including multiple values. For example, if the desired computation is to generate a result "y", such that y=ln(x), the received input is "x". Additionally, a degree of an interpolation polynomial, as discussed below, may be specified. Typically, x is a numeric value in a floating-point representation. For example, x may be represented in an IEEE 754 Standard double-precision binary floating-point format known as binary64, as shown in FIG. 1.

In 204, the mantissa, m, and the exponent, z, are extracted from the floating-point representation of x. This corresponds to expanding ln(x) to form its equivalent: $\ln(x)=\ln(2)*(\log_2(m+1)+z-z0)$. This expression includes four terms: ln(2) is a constant that can be computed a priori and stored for repeated use, $\log_2(m+1)$ is a bounded analytical function, with both m and $\log_2(m+1)$ defined in the range [0 1], z is a positive integer (the exponent of input x), and z0 is a positive integer, equal to the zero offset or exponent bias of the particular floating point representation being used. For example, for the IEEE 754 Standard double-precision binary floating-point format known as binary64, z0=1023.

The mantissa, m, and the exponent, z, may be extracted using software instructions, using hardware-specific instructions, or special purpose hardware. For example, in C++, z may be extracted using the instruction "reinterpret_cast<Int> (Real)" followed by a multiplication by a shift factor "S". For the binary64 representation, "S=2^-52". Thus, for example, z may be extracted by the C++ code: "unsigned long int z=S*reinterpret_cast<unsigned long int> (x);". Likewise, for example, in C++, m may be extracted using the instruction "reinterpret_cast<Int> (Real)", followed by two bitwise operations and a multiplication by a shift factor "S". Thus, for example, m may be extracted by the C++ code: "double m=((reinterpret_cast<unsigned long int> (x) & 0x000fffffffffffffL)|0x0010000000000000L)*S−1.0;". It is to be noted that, as later it is m+1 that is needed, and not m, m+1 may be directly computed by omitting the final "−1.0".

In 206, an interpolating polynomial for $\log_2(m+1)$ may be evaluated. An interpolating polynomial or other technique may be used to compute or approximate $\log_2(m+1)$ using polynomial interpolation. For example, "$\log_2(m+1)$ $F_n(m+1)=a*(m+1)^n+b*(m+1)^(n-1)+c*(m+1)^(n-2)+ \ldots$", where "n" is the order of the polynomial interpolation. Examples of polynomial interpolations that may be used include, but are not limited to, Lagrange polynomials, Orthogonal polynomials, such as Chebyshev and Legendre polynomials, Trigonometric polynomials, Piecewise polynomials, such as Spline and Hermite polynomials, and Remez Polynomials. However, it is to be noted that other suitable polynomials may be used, and that the present invention contemplates the use of any such polynomial. For example, the Chebyshev expansion of $\log(m+1)=\Sigma_{n=0}^{\infty} a_n T_n(x)$. The polynomial coefficients $\{a, b, c, \ldots\}$ are typically pre-computed according to the chosen interpolation polynomial. The polynomial may implemented following Homer's method, leading to a complexity of a floating-point multiply-add for each degree of the polynomial.

In 208, the logarithm of x, ln(x), may be computed according to "y=ln(2)*($F_n(m+1)+z-z0$)". The evaluation of y may be implemented as "y=ln(2)*($F_n(m+1)+$floor(z)−z0)". The floor function may be used to map a real number to the largest previous integer. The call to the floor function and the pre-multiplication by ln(2) (or log(2) for the base 10 logarithm) may be both omitted by the modified computation: "y=$G_n(m+1)+w-w0$", where "$G_n(m+1)=$ln(2)*($\log_2(m+1)-(m+1))$", w="static_cast<double>(ln(2)*S*reinterpret_cast<unsigned long int> (x));", and w0=ln(2)*(z0+1). It is noted that typically one evaluation of $G_n(m+1)$ costs the same computing resources as one evaluation of $F_n(m+1)$. In addition "ln(2)*S" and "w0" may be pre-computed constants.

In 210, the computed logarithm may be returned as the result. Depending upon the input, the result may be a single scalar result value, a list of multiple scalar result values, or a result vector including multiple values. Logarithms of other bases are easily computed. For example, the base 2 logarithm, $\log_2(x)$, may be computed by omitting the multiplication by ln(2) and the base 10 logarithm, log(x), may be computed by replacing the multiplication by ln(2) with a multiplication by log(2). Typically, the factors needed for such other base computations are constants that may be pre-computed and stored for use.

When compiled, the exemplary code shown above may be implemented as software instructions, or as hardware-specific instructions. For example, each of 202-210 may be implemented in software or as a set of one or more hardware instructions that may be specific to the hardware being used for the computation. Further improvements may be obtained by implementing part or all of the instructions in assembly code. Although modern compilers do a good job in optimizing the code, an assembler version would allow more precise control of the instructions that are actually used.

Figure 3:
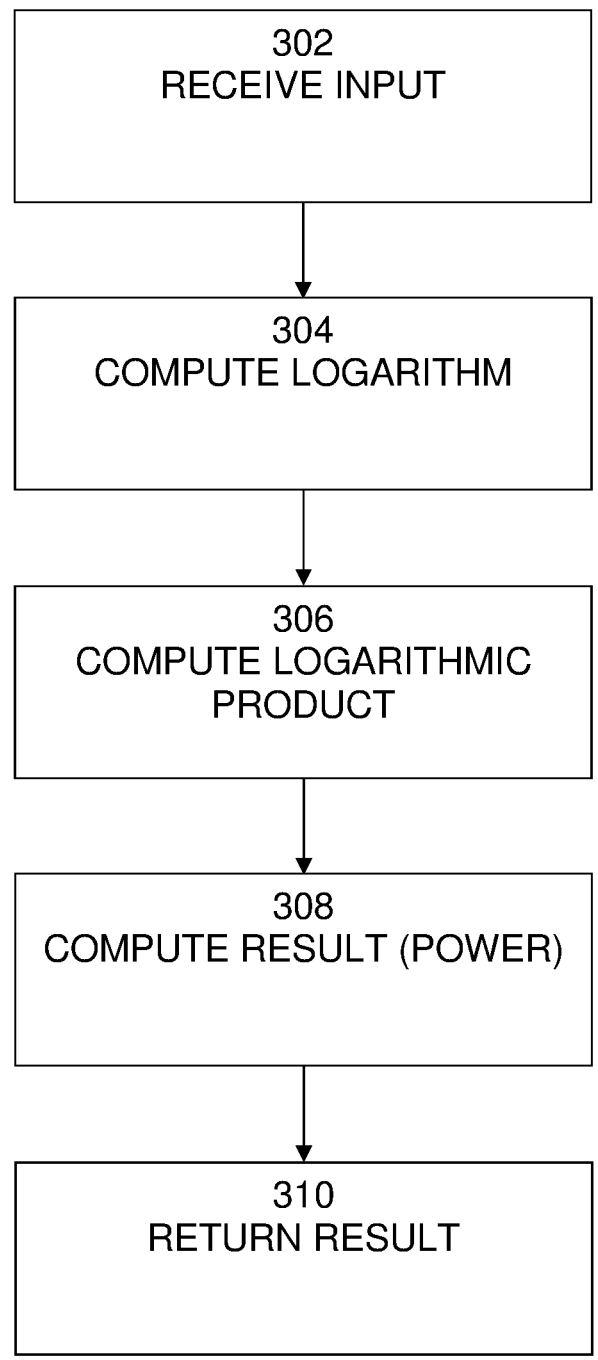
FIG. 3 is an exemplary flow diagram of a process of computing an exponentiation of an input.

An exemplary flow diagram of a process 300 of computing an exponentiation of an input is shown in FIG. 3. Process 300 begins with 302, in which an input, for which an exponentiation is to be computed, may be received. The input may be a single scalar input value, a list of multiple scalar input values, or an input vector including multiple values. For example, if the desired computation is to generate a result "y", such that "y=b^x", the received input may include the base "b" and the exponent, "x" Additionally, a degree "n1" of a polynomial to approximate the natural logarithm and a degree "n2" of a polynomial to approximate the natural exponential, may be specified. Typically, b and x are numeric values in a floating-point representation. For example, b and x may be represented in an IEEE 754 Standard double-precision binary floating-point format known as binary64, as shown in FIG. 1.

In 304, the logarithm of base b may be computed using process 200, shown in FIG. 2. The input b, and any specified or default value of n1 may be used to compute "$y1=\log_2(b)$". In order see the utility to the computation of "y=b^x", a logarithm of base 2 may be applied to both side of the power equation: "$\log_2(y)=\log_2(b^x)$". Using the logarithm power rule on the right side of the equation yields: "$\log_2(y)=x*\log_2(b)$". Thus, the computation of "$y1=\log_2(b)$" may be performed. For example, process 200 may be used to compute the logarithm.

In 306, an intermediate product "y2=x*y1" may be computed. As discussed above, this is equivalent to "$y2=x*\log_2(b)$". In 308, the final result (power or exponentiation) may be computed according to "y=2^y2", which is equivalent to "$y=2^{(x*\log_2(b))}$". This expression includes three operations: a logarithm of base 2, a multiplication, and an exponentiation of base 2. The logarithm and the exponentiation can be expressed with respect to other base values. For example, for base e: "$y=2^{(x*\log_2(b))}=e^{(x*\ln(b))}$". As base 2 is typically inherently implemented on modern computers, base 2 computation is typically advantageous.

The exponentiation 308 may be performed using, for example, the technique described in U.S. patent application Ser. No. 14/532,312, which is hereby incorporated by reference herein. For example, a first expression $A*(y2-\ln(2)*K_{n2}(y2_f))+B$ may be evaluated. In this expression, y2 may be the input to the exponentiation method, $K_{n2}(y2_f)$ may be a polynomial function of the degree n2, $y2_f$ may be a fractional part or mantissa of y2/ln(2), A may equal $2^{52}/\ln(2)$, and B may equal $1023*2^{52}$. It is to be noted that the present invention is not limited to this example, but rather contemplates any other suitable exponentiation method as well.

In 310, the computed exponentiation may be returned as the result. Depending upon the input, the result may be a single scalar result value, a list of multiple scalar result values, or a result vector including multiple values.

When compiled, the code for performing the logarithm or exponentiation computations may be implemented as software instructions, or as hardware-specific instructions. For example, each of 302-310 may be implemented in software, as a set of one or more hardware instructions that may be specific to the hardware being used for the computation, or as specialized hardware dedicated to performing these computations. Further improvements may be obtained by implementing part or all of the instructions in assembly code.

Although modern compilers do a good job in optimizing the code, an assembler version would allow more precise control of the instructions that are actually used.

Figure 4:
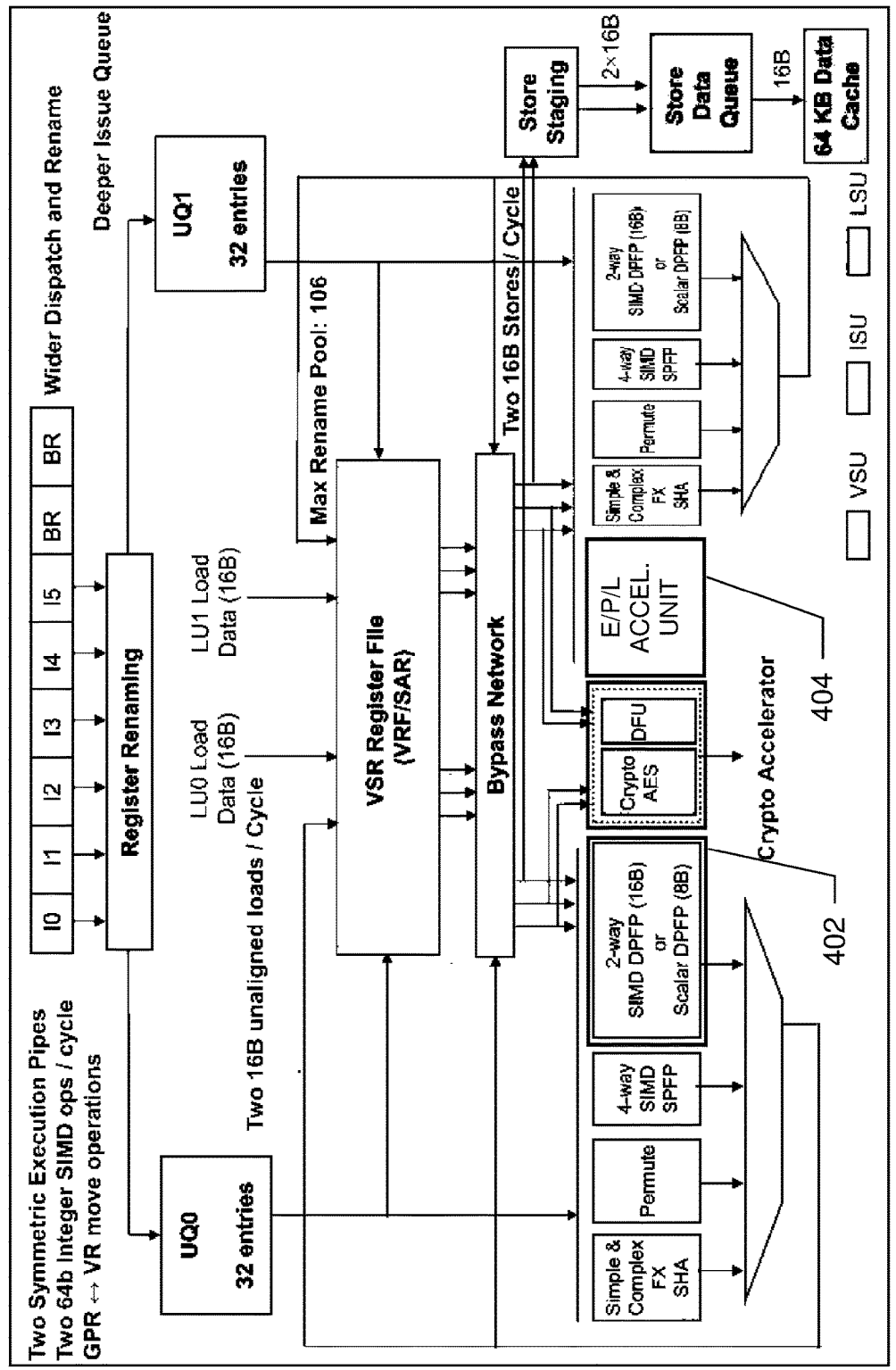
FIG. 4 is an exemplary block diagram of a computing architecture 400 in which the processes shown in FIGS. 2 and 3 may be implemented.

FIG. 4 is an exemplary block diagram of a computing architecture 400 in which the processes shown in FIGS. 2 and 3 may be implemented. In this example, the IBM® POWER8 architecture is shown. This architecture includes support for single instruction, multiple data (SIMD) processing. In an SIMD architecture, multiple processing elements perform the same operation on multiple units of data simultaneously. There are simultaneous (parallel) computations, but only a single process (instruction) at a given moment. The inputs to and outputs from SIMD processing may be vectors of multiple values. For example, processes 200 and 300 may be implemented so as to make use of short vector instruction units using SIMD vector instructions using the SIMD processing circuitry in the Vector Scalar Extension (VSX) processing unit 402. As another example, processes 200 and 300 may be implemented in hardware, such as using existing hardware, or in specialized hardware, such as Exponentiation/Power/Logarithm Accelerator Unit 404. Examples of architectures on which SIMD implementations may be used may include the IBM® POWER7 and POWER8 architectures INTEL® Streaming SIMD Extensions (SSE) or Advanced Vector Extensions (AVX), etc.

When implemented on an SIMD architecture, the instructions, including the loads, the store, the floating-point multiply-add, the floor, and the long int to double conversion may be SIMD vectorized. This provides the capability to process multiple logarithm or exponentiation computations at the same time, i.e., during the same CPU cycles.

Figure 5:
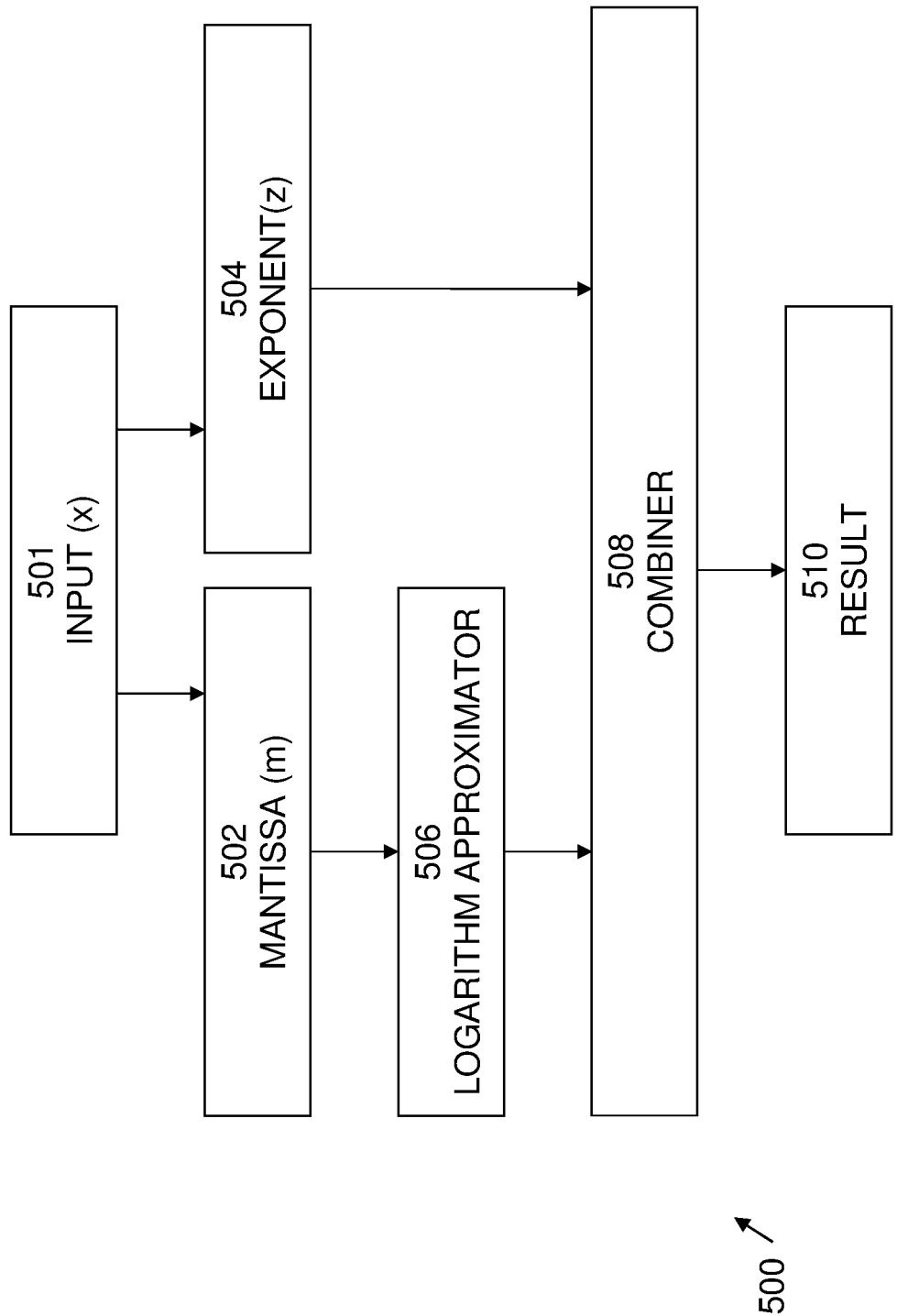
FIG. 5 is an exemplary block diagram of a specialized processing hardware system for computing a logarithm of an input.

Specialized processing hardware to perform the described processes may be included in or added to existing processing architectures, or included in newly-designed processing architectures. An example of a specialized processing hardware system 500 is shown in FIG. 5. System 500 is a hardware implementation of the computation performed in process 200, shown in FIG. 2. Specialized processing element 501 may be circuitry adapted to receive and store an input representation of a real number "x". Specialized processing elements 502 and 504 may be circuitry adapted to extract and store a mantissa "m" and exponent "z", respectively, based on the real number x, for example, as described for 204 above. Specialized processing element 506 may be circuitry adapted to approximate a function of a logarithm of the mantissa m of the real number x. The approximation may be performed utilizing a polynomial, which may be based on the mantissa m, for example, as described for 206 above, or using another technique. Component 508 may be circuitry adapted to combine the approximate function of the logarithm of the mantissa m and the exponent z, for example, as described for 208 above. Component 510 may be circuitry that may obtain and store a result of the computation, for example, as described for 210 above.

Figure 6:
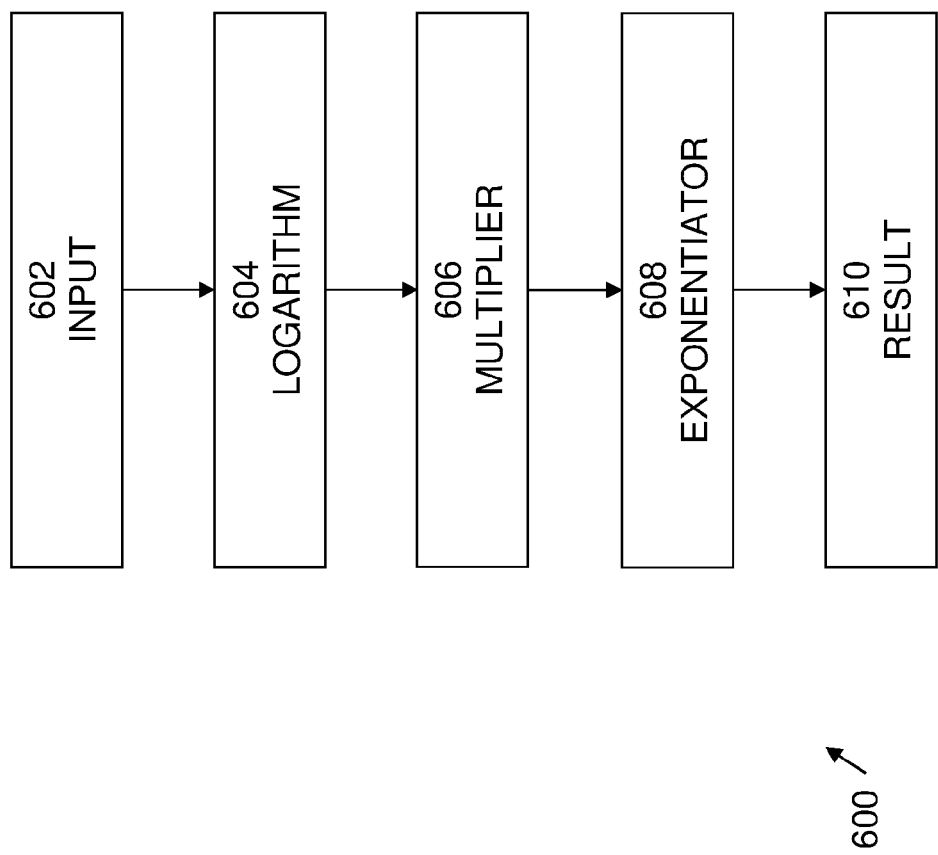
FIG. 6 is an exemplary block diagram of a specialized processing hardware system for computing an exponentiation of an input.

Likewise, an example of a specialized processing hardware system 600 is shown in FIG. 6. System 600 is a hardware implementation of the computation performed in process 300, shown in FIG. 3. Specialized processing element 602 may be circuitry adapted to receive and store an input value, for example, as described for 302 above. Specialized processing element 604 may be circuitry adapted to perform evaluation of a logarithm according to process 200, and/or system 600, for example, as described for 304 above. Specialized processing element 606 may be a multiplier circuit that may perform multiplication of factors to obtain an intermediate product, for example, as described for 306 above. Specialized processing element 608 may be circuitry adapted to perform exponentiation using a polynomial function or other technique to generate a result, for example, as described for 308 above. Specialized processing element 610 may be circuitry adapted to obtain and store a result of the computation, for example, as described for 310 above.

Systems 500 and 600 may be implemented using any electronic technology, such as discrete circuitry, programmable logic circuitry, field-programmable gate arrays (FPGA), programmable logic arrays (PLA), semi-custom integrated circuits, application-specific integrated circuits (ASIC), or any other electronic technology, in order to perform aspects of the present invention.

Accordingly, embodiments of the present disclosure are directed to a system for performing mathematical function evaluation. The system comprises a processing unit comprising logic comprising: a first set of hardware instructions configured to receive an input comprising a floating point representation of a real number and to extract a mantissa and an exponent; a second set of hardware instructions configured to approximate a function of a logarithm of a mantissa of the real number, wherein approximation is performed by utilizing a polynomial, and wherein the polynomial is based on the mantissa; and a third set of hardware instructions configured to combine the approximate function of the logarithm of the mantissa of the real number and the exponent for calculating a value comprising an approximate logarithm of the real number.

In embodiments of the above-described system, the polynomial is a Lagrange polynomial, an orthogonal polynomial, a Chebyshev polynomial, a Legendre polynomial, a trigonometric polynomial, a piecewise polynomial, a spline polynomial, a Hermite polynomial, or a Remez Polynomial.

In embodiments of the above-described system, the input further comprises a degree of the polynomial.

In embodiments of the above-described system, coefficients of the polynomial are precomputed.

In embodiments of the above-described system, the input is a single scalar input value, a list of multiple scalar input values, or an input vector including multiple values.

Embodiments of the above-described system further comprise a plurality of processing units, wherein each processing unit performs a same hardware instruction at a same time as the others of the plurality of processing units.

In embodiments of the above-described system, the input is a list of multiple scalar input values, or is an input vector including multiple values.

Embodiments are further directed to a computer-implemented method for using hardware instructions to accelerate evaluation of mathematical functions. The method comprises: executing a first set of hardware instructions to receive an input comprising a floating point representation of a real number and to extract a mantissa and an exponent; executing a second set of hardware instructions to approximate a function of a logarithm of a mantissa of the real number, wherein approximation is performed by utilizing a polynomial, and wherein the polynomial is based on the mantissa; and executing a third set of hardware instructions to combine the approximate function of the logarithm of the mantissa of the real number and the exponent for calculating a value comprising an approximate logarithm of the real number.

In embodiments of the above-described method, the polynomial is a Lagrange polynomial, an orthogonal polynomial, a Chebyshev polynomial, a Legendre polynomial, a trigonometric polynomial, a piecewise polynomial, a spline polynomial, a Hermite polynomial, or a Remez Polynomial.

In embodiments of the above-described method, the input further comprises a degree of the polynomial.

In embodiments of the above-described method, coefficients of the polynomial are precomputed.

In embodiments of the above-described method, the input is a single scalar input value, a list of multiple scalar input values, or an input vector including multiple values.

Embodiments of the above-described method further includes providing a plurality of processing units, wherein each processing unit performs a same hardware instruction at a same time as the others of the plurality of processing units.

In embodiments of the above-described method, the input is a list of multiple scalar input values, or an input vector including multiple values.

Embodiments are further directed to a system for performing mathematical function evaluation. The system comprises a processing unit comprising logic comprising: a first set of hardware instructions configured to receive an input comprising a floating point representation of a real number and a representation of a second number and to extract a mantissa and an exponent from the floating point representation of the real number; a second set of hardware instructions configured to approximate a function of a logarithm of a mantissa of the real number, wherein approximation is performed by utilizing a polynomial, and wherein the polynomial is based on the mantissa; a third set of hardware instructions configured to combine the approximate function of the logarithm of the mantissa of the real number and the exponent for calculating a value comprising an approximate logarithm of the real number; a fourth set of hardware instructions configured to multiply the approximate logarithm of the of the real number and the second number; and a fifth set of hardware instructions configured to exponentiate the product of the approximate logarithm of the of the real number and the second number for calculating a value comprising an approximation of the real number to the power of the second number.

In embodiments of the above-described system, the polynomial is a Lagrange polynomial, an orthogonal polynomial, a Chebyshev polynomial, a Legendre polynomial, a trigonometric polynomial, a piecewise polynomial, a spline polynomial, a Hermite polynomial, or a Remez Polynomial.

In embodiments of the above-described system, the input further comprises a degree of the polynomial.

In embodiments of the above-described system, coefficients of the polynomial are precomputed.

In embodiments of the above-described system, the input is a single scalar input value, a list of multiple scalar input values, or an input vector including multiple values.

Embodiments of the above-described system further comprises a plurality of processing units, wherein each processing unit performs a same hardware instruction at a same time as the others of the plurality of processing units.

In embodiments of the above-described system, the input is a list of multiple scalar input values, or an input vector including multiple values.

Embodiments are further directed to a computer-implemented method for using hardware instructions to accelerate evaluation of mathematical functions. The method comprises: executing a first set of hardware instructions configured to receive an input comprising a floating point representation of a real number and a representation of a second number and to extract a mantissa and an exponent from the floating point representation of the real number; executing a second set of hardware instructions configured to approximate a function of a logarithm of a mantissa of the real number, wherein approximation is performed by utilizing a polynomial, and wherein the polynomial is based on the mantissa; executing a third set of hardware instructions configured to combine the approximate function of the logarithm of the mantissa of the real number and the exponent for calculating a value comprising an approximate logarithm of the real number; executing a fourth set of hardware instructions configured to multiply the approximate logarithm of the of the real number and the second number; and executing a fifth set of hardware instructions configured to exponentiate the product of the approximate function of the logarithm of the mantissa of the real number and the second number for calculating a value comprising an approximation of the real number to the power of the second number.

In embodiments of the above-described method, the polynomial is a Lagrange polynomial, an orthogonal polynomial, a Chebyshev polynomial, a Legendre polynomial, a trigonometric polynomial, a piecewise polynomial, a spline polynomial, a Hermite polynomial, or a Remez Polynomial.

In embodiments of the above-described method, the input further comprises a degree of the polynomial.

In embodiments of the above-described method, coefficients of the polynomial are precomputed.

In embodiments of the above-described method, the input is a single scalar input value, a list of multiple scalar input values, or an input vector including multiple values.

Embodiments of the above-described method further comprise a plurality of processing units, wherein each processing unit performs a same hardware instruction at a same time as the others of the plurality of processing units.

In embodiments of the above-described method, the input is a list of multiple scalar input values, or an input vector including multiple values.

Embodiments are further directed to an apparatus comprising: a first at least one specialized processing elements specifically adapted to receive an input comprising a representation of a real number X; a second at least one specialized processing elements specifically adapted to extract a mantissa M and an exponent Z, based on the real number X, wherein the extraction of M and Z is obtained from a floating point representation; a third at least one specialized processing elements specifically adapted to approximate a function of a logarithm of the mantissa M of the real number X, wherein the approximation is performed utilizing a polynomial, and wherein the polynomial is based on the mantissa M; and a fourth at least one specialized processing elements specifically adapted to combine the approximate function of the logarithm of the mantissa M and the exponent Z for calculating a value comprising an approximate logarithm of the real number X; wherein the processing performed by the first, second, third, and/or fourth specialized processing elements for calculating the value comprising the logarithm is executed while utilizing an amount of memory that is significantly less than an amount of memory that would be used by a general standardized at least one processors for calculating the value.

In embodiments of the above-described apparatus, the polynomial is a Lagrange polynomial, an orthogonal polynomial, a Chebyshev polynomial, a Legendre polynomial, a trigonometric polynomial, a piecewise polynomial, a spline polynomial, a Hermite polynomial, or a Remez Polynomial.

In embodiments of the above-described apparatus, the input further comprises a degree of the polynomial.

In embodiments of the above-described apparatus, coefficients of the polynomial are precomputed.

In embodiments of the above-described apparatus, the input is a single scalar input value, a list of multiple scalar input values, or an input vector including multiple values.

Embodiments are further directed to an apparatus comprising: a first at least one specialized processing element specifically adapted to receive an input comprising a representation of a first real number X and a second number; a second at least one specialized processing element specifically adapted to extract a mantissa M and an exponent Z, based on the real number X, wherein the extraction of M and Z is obtained from a floating point representation; a third at least one specialized processing element specifically adapted to approximate a function of a logarithm of the mantissa M of the real number X, wherein the approximation is performed utilizing a polynomial, and wherein the polynomial is based on the mantissa M; a fourth at least one specialized processing element specifically adapted to combine the approximate function of the logarithm of the mantissa M of the real number X and the exponent Z for calculating a value comprising an approximate logarithm of the real number X; a fifth at least one specialized processing element specifically adapted to multiply the approximate logarithm of the real number X and the second number; and a sixth at least one specialized processing element specifically adapted to exponentiate the product of the of the real number X and the second number for calculating a value comprising an approximation of the real number X to the power of the second number; wherein the processing performed by the first, second, third, fourth, and/or fifth specialized processing elements for calculating the value comprising the logarithm is executed while utilizing an amount of memory that is significantly less than an amount of memory that would be used by a general standardized at least one processors for calculating the value.

In embodiments of the above-described apparatus, the polynomial is a Lagrange polynomial, an orthogonal polynomial, a Chebyshev polynomial, a Legendre polynomial, a trigonometric polynomial, a piecewise polynomial, a spline polynomial, a Hermite polynomial, or a Remez Polynomial.

In embodiments of the above-described apparatus, the input further comprises a degree of the polynomial.

In embodiments of the above-described apparatus, coefficients of the polynomial are precomputed.

In embodiments of the above-described apparatus, the input is a single scalar input value, a list of multiple scalar input values, or an input vector including multiple values.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for performing mathematical function evaluation, the system comprising:
    a processing unit comprising:
    a first processing resource configured to:
        receive an input comprising a specified degree for a polynomial and an input vector including multiple scalar input values, wherein each scalar input value is represented by a double-precision binary floating-point representation; and
    a second processing resource configured to support a single instruction multiple data (SIMD) processing and further configured to:
        extract a mantissa and an exponent from the floating point representation of the real number for each input value in the input vector during the same Central Processing Unit (CPU) cycle using a first SIMD instruction;
    a third processing resource configured to support the SIMD processing and further configured to:
        approximate a function of a logarithm of the mantissa of the real number for each input value in the input vector during the same CPU cycle using a second SIMD instruction, wherein approximation is performed by utilizing a polynomial having the specified degree, and
        wherein the polynomial is based on the mantissa; and
    a fourth processing resource configured to support the SIMD processing and further configured to:
        combine the approximate function of the logarithm of the mantissa of the real number and the exponent for calculating a first value for each input value in the input vector during the same CPU cycle using a third SIMD instruction;
        subtract an exponent bias from the first value for each input value in the input vector during the same CPU cycle using a fourth SIMD instruction, wherein the exponent bias is based on the floating point representation of the real number; and
        multiply the first value by a precomputed constant to calculate a second value comprising an approximate logarithm of the real number for each input value in the input vector during the same CPU cycle using a fifth SIMD instruction.

2. The system of claim 1, wherein the polynomial is a Lagrange polynomial, an orthogonal polynomial, a Chebyshev polynomial, a Legendre polynomial, a trigonometric polynomial, a piecewise polynomial, a spline polynomial, a Hermite polynomial, or a Remez Polynomial.

3. The system of claim 1, wherein coefficients of the polynomial are precomputed.

4. A computer-implemented method for using hardware instructions to accelerate evaluation of mathematical functions, the method comprising:
    executing, on a first processing resource, a set of hardware instructions to receive an input comprising a specified degree for a polynomial and an input vector including multiple scalar input values, wherein each scalar input value is represented by a double-precision binary floating-point representation; and
    executing, on a second processing resource configured to support a single instruction multiple data (SIMD) processing, a first SIMD instruction to extract a mantissa and an exponent from the floating point representation of the real number for each input value in the input vector during the same Central Processing Unit (CPU) cycle;
    executing, on a third processing resource configured to support the SIMD processing, a second SIMD instruction to approximate a function of a logarithm of a mantissa of the real number for each input value in the input vector during the same CPU cycle, wherein approximation is performed by utilizing a polynomial having the specified degree, and wherein the polynomial is based on the mantissa;
    executing, on a fourth processing resource configured to support the SIMD processing, third SIMD instruction to combine the approximate function of the logarithm of the mantissa of the real number and the exponent for calculating a first value for each input value in the input vector during the same CPU cycle;
    executing, on the fourth processing resource configured to support the SIMD processing, a fourth SIMD instruction to subtract an exponent bias from the first value, wherein the exponent bias is based on the floating point representation of the real number for each input value in the input vector during the same CPU cycle; and executing, on the fourth processing resource configured to support the SIMD processing, a fifth SIMD instruction to multiply the first value by a precomputed constant to calculate a second value comprising an approximate logarithm of the real number for each input value in the input vector during the same CPU cycle.

5. The computer-implemented method of claim 4, wherein the polynomial is a Lagrange polynomial, an orthogonal polynomial, a Chebyshev polynomial, a Legendre polynomial, a trigonometric polynomial, a piecewise polynomial, a spline polynomial, a Hermite polynomial, or a Remez Polynomial.

6. The computer-implemented method of claim 4, wherein coefficients of the polynomial are precomputed.

7. A computer program product for accelerating evaluation of mathematical function, the computer program product comprising:

a computer readable storage medium having program instructions embodied therewith, wherein the computer readable storage medium is not a transitory signal per se, the program instructions readable by a processor system to cause the processor system to perform a method comprising:

executing, on a first processing resource, a set of hardware instructions to receive an input comprising a specified degree for a polynomial and an input vector including multiple scalar input values, wherein each scalar input value is represented by a double-precision binary floating-point representation; and executing, on a second processing resource configured to support a single instruction multiple data (SIMD) processing, a first SIMD instruction to extract a mantissa and an exponent from the floating point representation of the real number for each input value in the input vector during the same Central Processing Unit (CPU) cycle;

executing, on a third processing resource configured to support the SIMD processing, a second SIMD instruction to approximate a function of a logarithm of a mantissa of the real number for each input value in the input vector during the same CPU cycle, wherein approximation is performed by utilizing a polynomial having the specified degree, and wherein the polynomial is based on the mantissa;

executing, on a fourth processing resource configured to support the SIMD processing, third SIMD instruction to combine the approximate function of the logarithm of the mantissa of the real number and the exponent for calculating a first value for each input value in the input vector during the same CPU cycle;

executing, on the fourth processing resource configured to support the SIMD processing, a fourth SIMD instruction to subtract an exponent bias from the first value for each input value in the input vector during the same CPU cycle, wherein the exponent bias is based on the floating point representation of the real number; and executing, on the fourth processing resource configured to support the SIMD processing, a fifth SIMD instruction to multiply the first value by a precomputed constant to calculate a second value comprising an approximate logarithm of the real number for each input value in the input vector during the same CPU cycle.

8. The computer program product of claim 7, wherein the polynomial is a Lagrange polynomial, an orthogonal polynomial, a Chebyshev polynomial, a Legendre polynomial, a trigonometric polynomial, a piecewise polynomial, a spline polynomial, a Hermite polynomial, or a Remez Polynomial.

9. The computer program product of claim 7, wherein coefficients of the polynomial are precomputed.

* * * * *